United States Patent [19]

Renaud

[11] Patent Number: 4,609,085
[45] Date of Patent: Sep. 2, 1986

[54] MULTIPLE CLUTCH COVER ASSEMBLY

[75] Inventor: Pierre Renaud, Le Plessis-Trevise, France

[73] Assignee: Valeo, Paris, France

[21] Appl. No.: 493,816

[22] Filed: May 12, 1983

[30] Foreign Application Priority Data

May 14, 1982 [FR] France ................. 82 08424

[51] Int. Cl.⁴ .................. F16D 13/69; F16D 13/70
[52] U.S. Cl. .................... 192/70.23; 192/109 R
[58] Field of Search ........... 192/70.28, 70.21, 99 R, 192/70.11, 70.18, 70.23, 101, 109 R, 70.29, 70.30, 99 A

[56] References Cited

U.S. PATENT DOCUMENTS

| 1,756,428 | 4/1930 | Jones | 192/99 A |
| 2,257,877 | 10/1941 | Binder | 192/69 |
| 2,417,035 | 3/1947 | Zeidler | 192/99 A |
| 2,920,731 | 1/1960 | Zeidler | 192/99 A |
| 3,554,342 | 1/1971 | Spokas | 192/70.18 |
| 3,653,475 | 4/1972 | Thelander | 192/99 A |
| 4,026,400 | 5/1977 | Rawlings | 192/99 A |
| 4,086,995 | 5/1978 | Spokas | 192/70.28 |
| 4,116,322 | 9/1978 | Ashfield | 192/70.28 |
| 4,429,776 | 2/1984 | Maucher et al. | 192/99 A |
| 4,465,170 | 8/1984 | Marchisio | 192/70.21 |

FOREIGN PATENT DOCUMENTS

| 2656626 | 12/1976 | Fed. Rep. of Germany | 192/70.28 |
| 2751357 | 5/1979 | Fed. Rep. of Germany | 192/70.3 |
| 2004581 | 11/1969 | France . | |
| 2409418 | 6/1979 | France . | |

Primary Examiner—Samuel Scott
Assistant Examiner—H. A. Odar
Attorney, Agent, or Firm—Charles E. Brown; Charles A. Brown

[57] ABSTRACT

A travel limiting lever is rockably mounted about an axis at right angles to the axis of the cover assembly and comprises two camming surfaces, one of the camming surfaces being engageable with the reaction plate or flywheel and the other being engageable with the cover. The lever is subjected to resiliently loaded friction action for controlling the angular position of the lever. The camming surfaces are both disposed on the same side of a plane which passes through the axis and also passes through the axis of the cover assembly or is parallel thereto.

14 Claims, 13 Drawing Figures

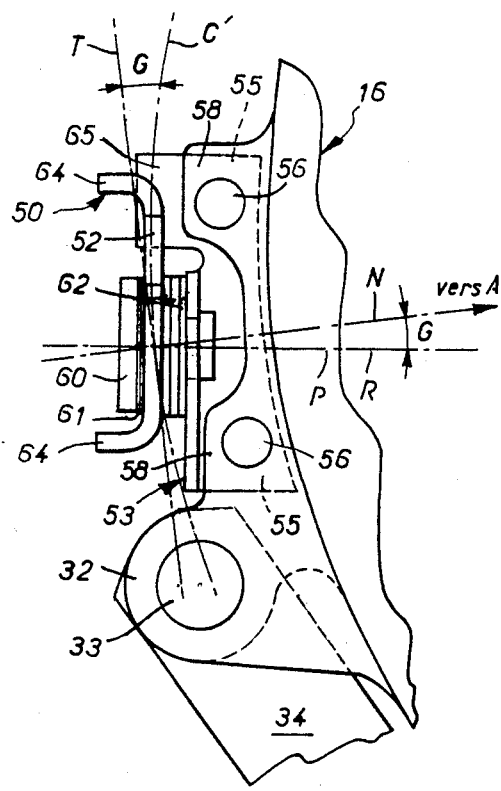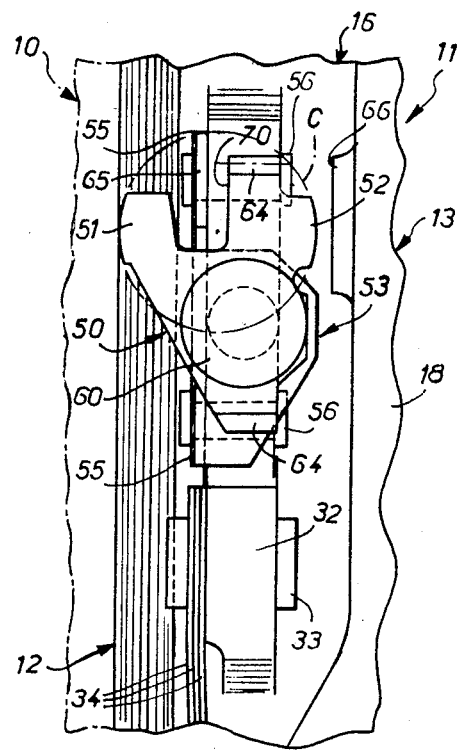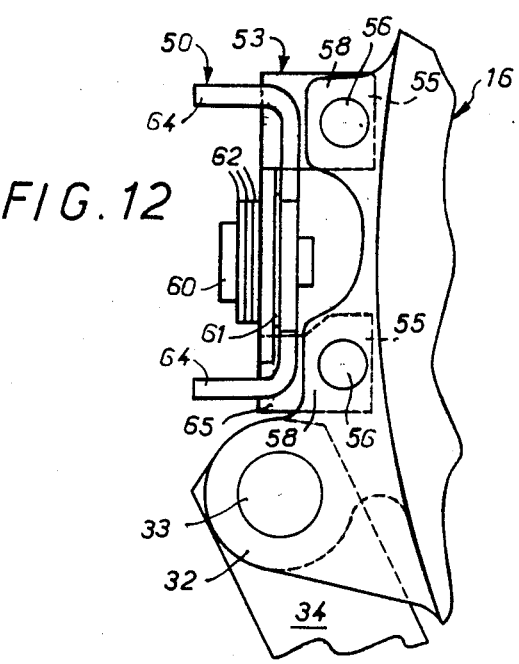

4,609,085

MULTIPLE CLUTCH COVER ASSEMBLY

BACKGROUND OF THE INVENTION

The present invention relates generally to multiple clutches or multiple disc clutches and, more particularly though not exclusively, to clutches comprising two clutch discs for use in motor vehicles, generally known as double disc clutches which have only one output or clutches known as dual clutches which have two outputs.

As is known such clutches comprise a reaction plate or flywheel which is generally fixed for rotation with a driving shaft and a plurality of parts forming a unitary assembly generally known as the cover assembly which is mounted on the reaction plate and a clutch disc or plate disposed between the reaction plate and the cover assembly and fixed for rotation with the driven shaft.

As is known, when a clutch comprises two clutch discs it comprises an annular member called a cover forming a housing and adapted to be mounted on the reaction plate, and two axially spaced annular plates called pressure plates which clamp or press therebetween the intermediate clutch disc, and resilient means bearing against the cover and constantly biasing the pressure plates away from the cover and disengagement means provided for each of the pressure plates for returning them toward the cover.

For multiple clutches two or more pressure plates are provided alternating with the clutch discs, in double disc clutches the inner clutch disc between the two pressure plates is fixed for rotation with the same driven shaft as the outer clutch disc which is between the terminal pressure plate and the reaction plate. In the case of a dual clutch the inner clutch disc is fixed for rotation with another driven shaft. In any event in the clutch engaged position the clutch discs are both clamped or pressed. When the clutch is disengaged the clutch discs are released or unclamped and in order to avoid any residual friction which is inevitably a source of wear of the facings of the clutch discs, the pressure plates associated therewith are subjected to disengagement or separating means which exert a return action thereon.

The disengagement or separating means associated with the outer clutch disc between the outer pressure plate and the reaction plate normally safely ensures the release of the clutch disc since the terminal pressure plate which is then urged toward the cover necessarily moves away from the reaction plate. But this is not necessarily so for the inner clutch disc between the two pressure plates. Under the action of their disengagement means the pressure plates are both, returned or urged toward the cover. Unless other measures are taken they may clamp around the inner clutch disc therebetween.

DESCRIPTION OF THE PRIOR ART

To obviate this problem it has already been proposed to associate with the terminal pressure plate which is remote from the cover means for limiting the lift or travel on disengagement. Such is the case with U.S. Pat. No. 3,554,342 and French patent publication No. 2,004,581.

In U.S. Pat. No. 3,554,342 the means for limiting the travel associated with the outer pressure plate is a lever which is pivotally mounted on the terminal pressure plate about an axis of rotation at right angles to the axis of the clutch and it comprises two camming surfaces one which is engageable with the reaction plate and the other which is engageable with one of the component parts of the cover assembly which in practice is the other or inner clutch disc.

The travel limiting lever is biased by a compound spiral spring for constantly urging it to an operative position as a cross with respect to the pressure plate parallel to the axis of the clutch. Thus, upon clutch disengagement the travel limiting lever maintains the terminal pressure plate in a position intermediate the reaction plate and the pressure plate thereby limiting the lift or travel of the terminal pressure plate to half that of the intermediate pressure plate. It ensures identical release movements of both clutch discs.

The compound spiral spring which is associated with the travel limiting lever acts in the opposite direction to the resilient engagement means. The strength of the resilient engagement means is therefore effectively reduced accordingly. Further, the compound spiral spring is relatively complicated and expensive to manufacture. Moreover, unless the compound spiral spring is relatively powerful, to the detriment of the action of the resilient engagement means, it is incapable of deploying the travel limiting lever. Since it is disposed at a considerable distance from the axis of the clutch, as it is mounted on a bracket along the edge of the pressure plate, it is subjected to considerable centrifugal force and friction against the bracket is increased by the centrifugal force—which is always rather irratic—thereby inevitably hampering the action of the travel limiting lever.

Furthermore, owing to the action of the travel limiting lever it fails to compensate for the variation of the relative thickness of the facings of the clutch discs and particularly the outer clutch disc between the reaction plate and the terminal pressure plate and therefore the wear of these friction facings.

The travel limiting means disclosed in French patent publication No. 2,004,581 comprises a bar mounted on a support fixed to the terminal pressure plate and is slidably mounted parallel to the axis of the clutch and subjected to radially acting friction means with resilient means for controlling the position relative to the support and therefore relative to the terminal pressure plate.

One of the ends of the bar is adapted to bear against the reaction plate and the other end is adapted to bear against the other pressure plate. Upon engagement and depending on the wear of the friction facings of the outer clutch disc between the intermediate pressure plate and the reaction plate, it is displaced axially by bearing against the reaction plate. Upon disengagement the bar limits the travel or lift of the pressure plate by abutment against the pressure plate. But since the bar is slidably mounted the operation of the travel limiting bar is relatively unsure and insofar as the bar is slightly inclined with respect to the bracket on which it is mounted it may jam against the corresponding sidewalls thereof.

SUMMARY OF THE INVENTION

A general object of the present invention is to provide an arrangement which obviates these drawbacks and has amongst other advantages reliable and efficient operation of the travel limiting means associated with the pressure plate.

According to the invention there is provided a multiple clutch cover assembly comprising a cover defining, a housing and adapted to be mounted on a reaction plate or flywheel. Two axially spaced annular pressure plates are provided including an intermediate pressure plate and a terminal pressure plate. An inner clutch disc is disposed axially between the intermediate and terminal pressure plates and an outer clutch disc is disposed axially between the terminal pressure plate and the reaction plate. Resilient engagement means bears against the cover and constantly urges the pressure plate away from the cover and disengagement means urges each of the pressure plates individually toward the cover. The terminal pressure plate has a travel limiting lever rockably mounted about an axis of rotation at right angles to the axis of the cover assembly. The travel limiting lever has two camming surfaces, one of the camming surfaces being engageable with the reaction plate. The travel limiting lever has resiliently preloaded friction means operative perpendicularly to the axis of rotation for controlling the position of the travel limiting lever. Both the camming surfaces are disposed on the same side of a plane passing through the axis of rotation and substantially parallel to or through the axis of the cover assembly. The other camming surface is engageable with the cover. Another aspect of the present invention comprises a double disc friction clutch.

The travel limiting means of the invention has the advantages of a lever as well as those of a member whose position is controlled by the resiliently preloaded friction means. According to the present invention this is provided by the particular arrangement of the camming surfaces on the lever, one of which is engageable with the reaction plate and the other of which is engageable with the cover. This novel arrangement enables such a lever to be substituted for a sliding bar. Consequently, no spring opposing the resilient engagement means is provided on the lever, the only resilient means employed, which is provided for loading the friction means associated with the lever and which may advantageously comprise, for example, spring washers of the Belleville washer type, does not in any way interfere with the resilient engagement means.

Further, a predetermined lift of the terminal pressure plate is insured regardless of the relative thicknesses of the facings of the outer clutch disc between the terminal pressure plate and the reaction plate and therefore regardless of the possible wear of the friction facings. The overall travel of both pressure plates is moreover substantially constant, maintained substantially constant by adjustment means usually provided for the corresponding actuating linkage. The lift or travel of the pressure plate disposed axially closest to the cover is then always sufficient to insure a satisfactory separation of the inner clutch disc disposed between the pressure plates. In other words the travel limiting means according to the invention advantageously provides satisfactory disengagement of both of the clutch discs without any undue mechanical complication. Indeed, it has been found that it is not absolutely necessary for the terminal pressure plate to be exactly midway between the reaction plate and the intermediate pressure plate upon disengagement to achieve this result.

Preferably, the camming surfaces on the travel limiting lever both are of part circular contour, and both part circular contours lie along the same circle.

Upon disengagement the distance between the terminal pressure plate and the reaction plate thus remains strictly geometrically constant whatever the zone of the camming surfaces on the travel limiting lever in contact with the terminal pressure plate and the reaction plate.

According to another feature of the invention the travel limiting lever comprises an arm radially directed away from the axis of the cover assembly. Consequently, it is easier to grasp the travel limiting lever. In particular it is, then, possible during the mounting of the cover assembly on the reaction plate to unclamp or release the inner clutch disc between the pressure plates with the travel limiting lever, in case the inner clutch disc is in an eccentric position with respect to the axis of the clutch and it is necessary to align the axis of the inner clutch disc with the axis of the clutch. To this end the technician bears against the arm of the travel limiting lever with tool to bring it into engagement with the cover and bearing against the cover moves the terminal pressure plate away from the cover.

BRIEF DESCRIPTION OF THE DRAWINGS

These and other features of the invention will become apparent from the description of the invention which follows, given by way of example, with reference to the accompanying diagrammatic drawings.

FIGS. 10 and 11 are views similar to FIGS. 5 and 6, respectively, for an alternative embodiment; and FIG. 12 is a view similar to that of FIG. 5 for another embodiment of the invention.

DESCRIPTION OF THE PREFERRED EMBODIMENTS

The drawings illustrate, by way of example, the application of the invention to a double disc friction clutch.

As is known per se such a double disc clutch comprises a reaction plate or flywheel 10 and a cover assembly 11 suitably mounted by threaded fasteners on the reaction plate 10 with a clutch disc or friction disc 12, referred to as the outer clutch disc, inserted between the reaction plate and the cover assembly.

Figure 2:
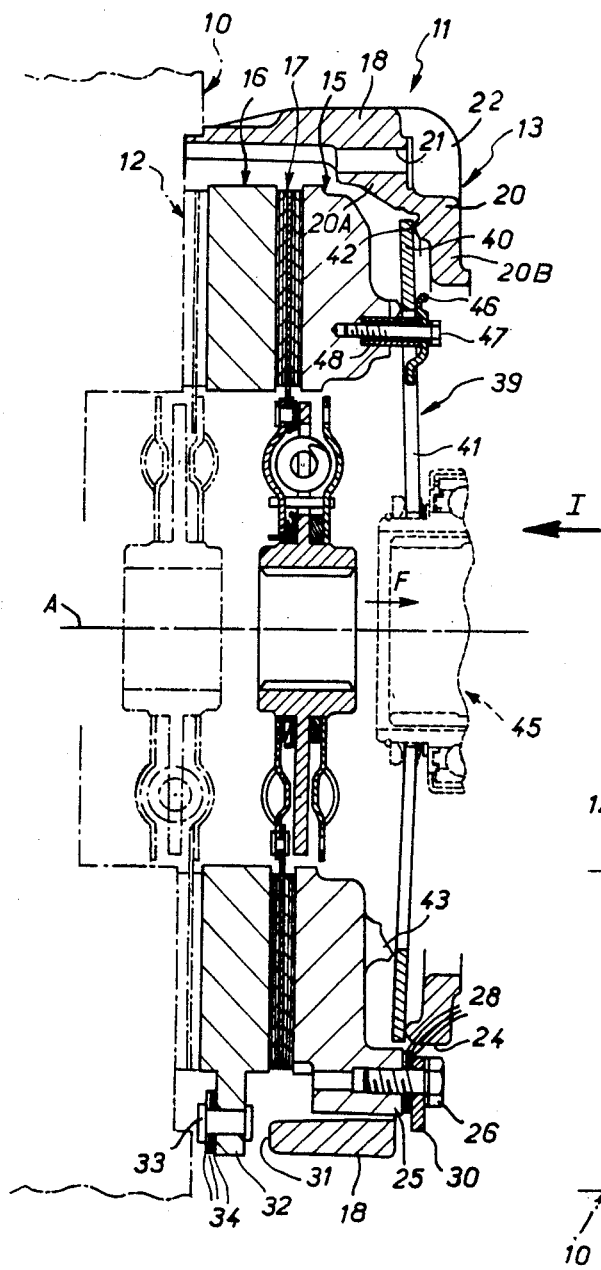
FIG. 2 is a longitudinal sectional view taken along broken line II—II in FIG. 1.
Figure 3:
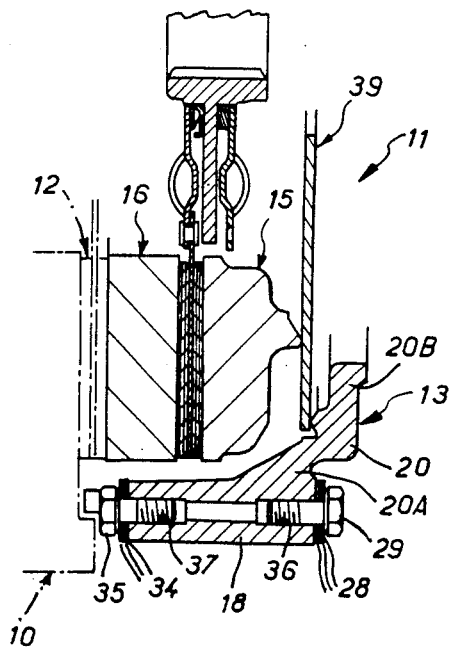
FIG. 3 is a partial longitudinal sectional view taken along line III—III in FIG. 1.
Figure 5:
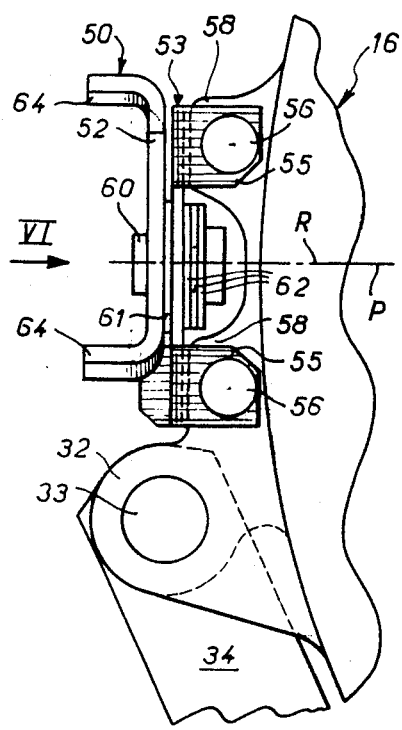
FIG. 5 is enlarged showing in vertical position of the area enclosed in box V in FIG. 1.
Figure 6:
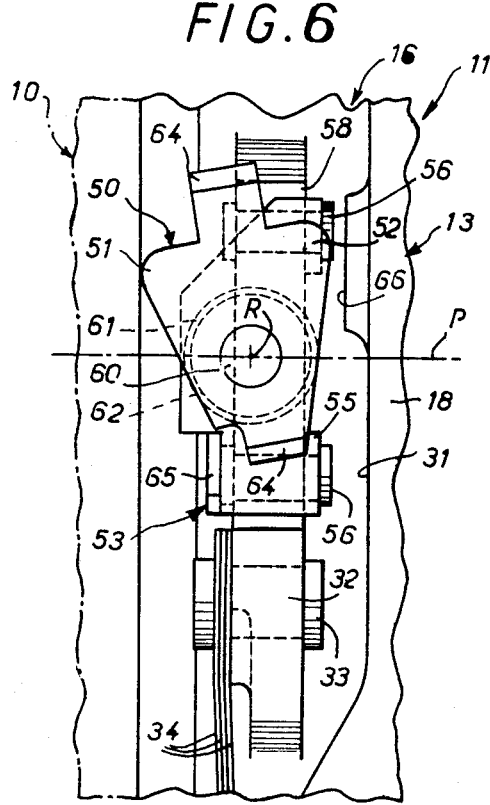
FIG. 6 is a fragmentary side view on the same scale as FIG. 5 taken in the direction of arrow VI in FIG. 5.
Figure 7:
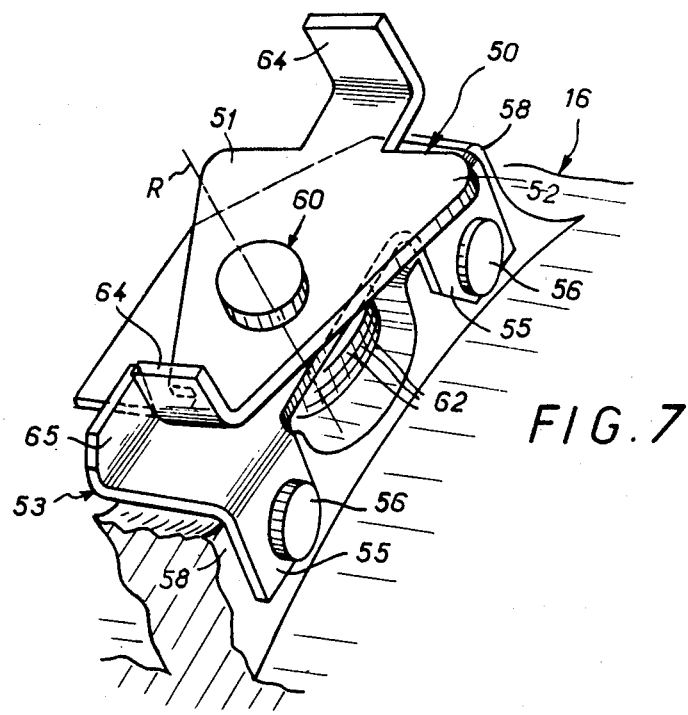
FIG. 7 is a perspective view of the travel limiting means equipping the cover assembly according to the invention.

The reaction plate 10 which is only diagrammatically illustrated in the drawings and only partially in FIGS. 2 and 3 is usually fixed for rotation with a first shaft, generally the driving shaft, which is the engine output shaft or crankshaft in the case of a motor vehicle. Since the reaction plate per se is not part of the present invention it will not be described in greater detail. Needless to say it may be of any known configuration.

The clutch cover assembly 11 comprises, as is known per se, an annular cover 13 which defines a housing, and axially spaced inside the cover 13 two annular pressure plates 15 and 16 which clamp between themselves a clutch disc 17 referred to as the inner clutch disc. The intermediate pressure plate 15 is the one axially closer to cover 13 and the terminal pressure plate 16 is the one axially remote from the cover 13.

Generally speaking, the cover 13 comprises a cylindrical or frustoconical sidewall 18 and a radially inwardly directed flange 20 extending from the end of the sidewall 18 remote from the reaction plate 10. The cover assembly 11 is mounted on the reaction plate 10 by the cover 13, holes 21 being provided at spaced locations on the flange 20 of the cover 13 for receiving threaded fasteners (not shown).

In the illustrated embodiment the flange 20 of the cover 13 has two sections 20A, 20B axially and radially spaced from each other. Section 20A is the radially outward section of the flange 20 which has the holes 21 for the threaded fasteners. The sections 20A and 20B are in one-piece with each other. Section 20A is externally connected to section 20B at spaced locations by radial stiffening ribs 22.

The intermediate pressure plate 15 is fixed for rotation with the cover 13 and axially moveable with respect to the latter. To this end the intermediate pressure plate 15 comprises in line with recesses 24 in the radially outer section 20A of the flange 20, bosses 25. Resiliently deformable drive straps 28, are attached by threaded fasteners to bosses 25. The drive straps 28 are in groups of three in the illustrated embodiments and extend substantially chordally. The other ends of straps 28 are attached by threaded fasteners 29 to cover 13 and more particularly to the radially outer section 20A of the flange 10 thereof, in line with the sidewall 18 of the cover 13.

In the illustrated embodiment each threaded fastener 26 is associated with a shim 30 which is inserted between the head of the threaded fastener 26 and the corresponding drive straps 28. The shims 30 are arranged radially so as to bear against the edges of the sidewall 18 of the cover 13 in the corresponding recess 24 of the radially outer section 20A of the flange when the cover assembly is stored.

The terminal pressure plate 16 is also fixed for rotation with cover 13 and axially moveable with respect to the latter.

Through cutouts 31 in the sidewall 18 of cover 13 pressure plate 16 has circumferentially spaced radially projecting lugs 32 which are attached to the drive straps 34 by rivets 33. The drive straps 34 are arranged in groups of three in the illustrated embodiment. Drive straps 24 extend generally chordally and are attached to cover 13 at their other end by threaded fasteners 35 and more particularly to the edge of the sidewall 18. In the illustrated embodiments threaded fasteners 35 are located in line with corresponding threaded fasteners 29 attaching drive straps 28 to the intermediate pressure plate 15 so that the corresponding axial holes 36 and 37 through the sidewall 18 of the cover 13 are in axial alignment with one another which may facilitate the machining of the cover 13 (FIG. 3).

The features of clutch discs 12 and 17 are not part of the present invention and therefore will not be described in detail. Clutch disc 12 is, moreover, illustrated in chain-dotted lines in the drawings, in particular in FIG. 2.

Since the illustrated clutch is a double disc friction clutch having only a single output, the clutch discs 12 and 17 are adapted to be fixed for rotation by their hubs to a single shaft, in practice the driven shaft, for example the transmission input shaft in the case of motor vehicle.

Pressure plates 15 and 16 are both subjected to the resilient engagement means bearing against cover 13 and constantly urging them away from the cover. In the illustrated embodiments the resilient engagement means comprises a diaprhagm spring 39 comprising a Belleville washer outer peripheral portion 40 and a central portion divided into radial fingers 41, The outer peripheral portion 40 of diaphragm spring 39 bears against the flange 20 of cover 13, the radially inner section 20B of cover 13 having an axially projecting annular bead 42 which may be formed by a plurality of circumferentially spaced apart annular sections. The diaphragm spring 39 bears against the intermediate pressure plate 15 which has an axially projecting annular bead 43 which, in practice, comprises a plurality of circumferentially spaced apart annular sections.

A release member or clutch release bearing 45 which is only partially and diagrammatically represented in FIG. 2, is adapted to engage the free ends of radial fingers 41 of diaphragm spring 39. In the illustrated embodiments the clutch release bearing 45 is of the so-called pull type which means it acts in the direction away from the reaction plate 10, indicated by arrow F in FIG. 2. The diameter of the annular bead 42 on cover 13 is greater than that of the annular bead 43 on the intermediate pressure plate 15.

Figure 1:
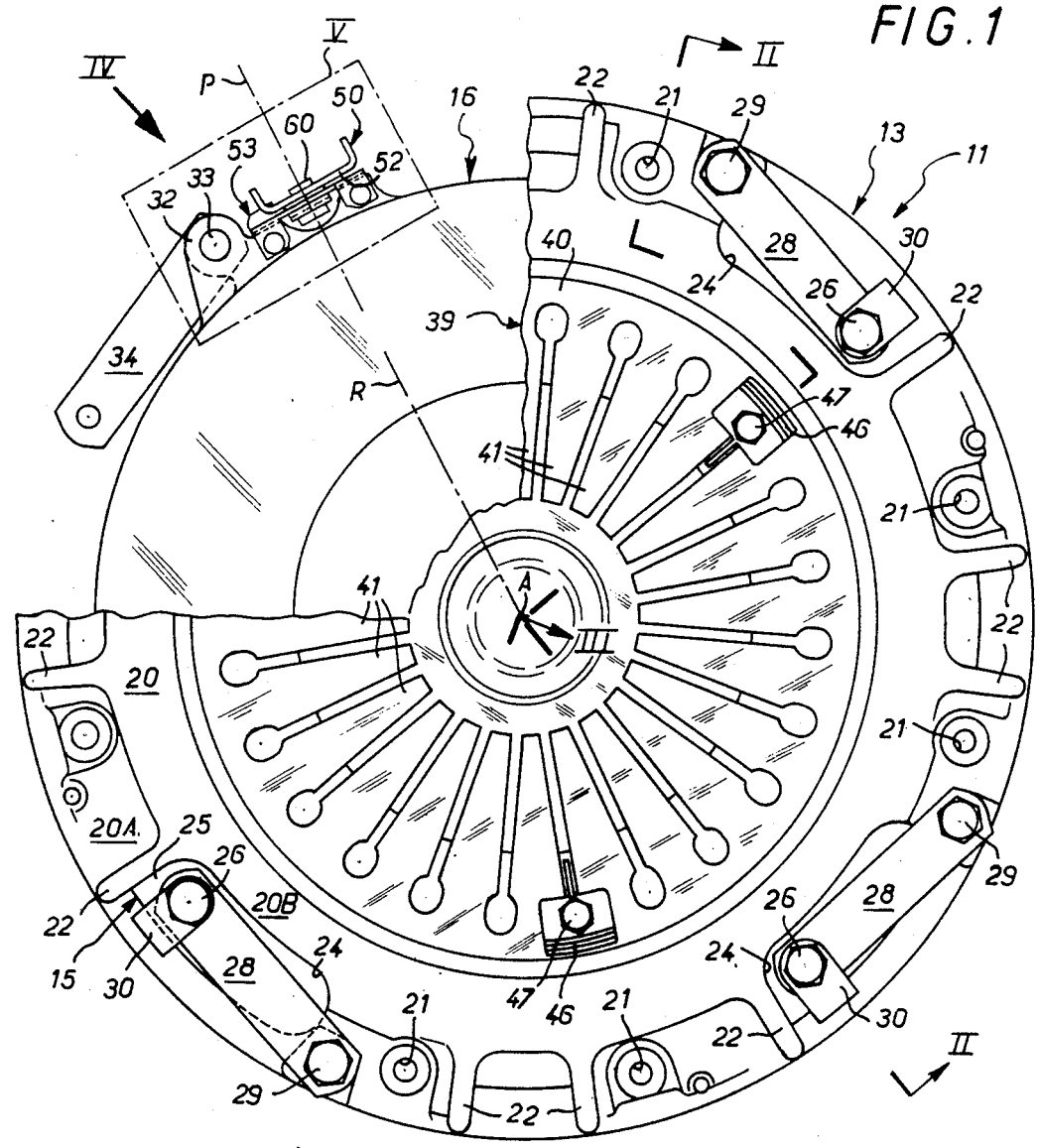
FIG. 1 is an elevational view, with a portion broken away, of a cover assembly taken in the direction of arrow I in FIG. 2.
Figure 4:
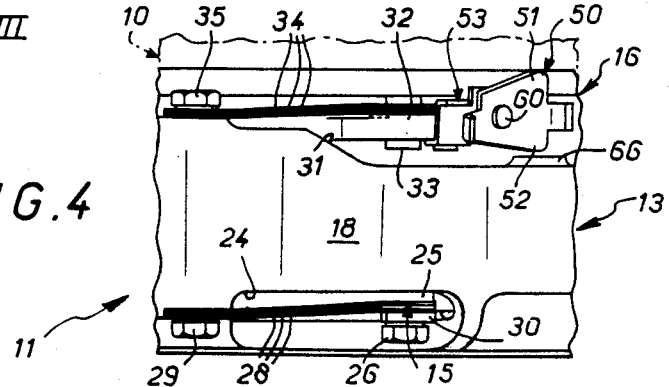
FIG. 4 is a partial side elevational view taken in the direction of arrow IV in FIG. 1.

Further, in the illustrated embodiments the diaphragm spring 39 is attached to the inner pressure plate 15 by generally radial clips 46 on the side of the diaphragm spring 39 remote from the inner pressure plate 15. The clips 46 are individually inserted between the heads of threaded fasteners 47 fixed axially to the intermediate pressure plate 15 and the edges of tubular spacers 48 mounted on the pressure plate 15 around the threaded fasteners 47, FIGS. 1 and 2.

Each of the pressure plates 15 and 16 also has its own disengagement means for returning or urging them toward the cover 13, and more particularly toward the flange 20 thereof. In practice the disengagement means for terminal pressure plate 16 comprises drive straps 34 associated with the pressure plate 16 and having a camber suitable for this purpose. The disengagement means for intermediate pressure plate 15 comprises clips 46 on diaphragm spring 39 which cooperate or coact with the drive straps 23 as described below.

Obviously the return or disengagement force exerted constantly by the resilient straps and clips in the direction of arrow F in FIG. 2, is very much less than the force exerted in the opposite direction by the diaphragm spring 39 in the engagement position of the clutch.

The foregoing arrangements are known per se and do not require more detailed description herein.

Likewise as is known per se, at least one travel limiting lever 50 is associated with the terminal pressure plate 16 which is axially remote from the cover 13 and more particularly from the flange 20 thereon. The traval limiting lever 50 is pivotally mounted on the terminal pressure plate 16 about an axis of rotation R which is at right angles to the axis of the clutch. The lever 50 comprises two camming surfaces 51, 52, one of the camming surfaces 51 being engageable with the reaction plate 10 and the other camming surfaces 52 being engageable with one of the component parts of the cover assembly 11.

In actual practice there are four such travel limiting levers 50 which are uniformly circularly spaced about the axis A of the clutch and each one of the levers 50 is mounted on the edge of the pressure plate 16 by means of a support plate 53 which will be described in greater detail hereinbelow.

According to the invention one of the travel limiting levers 50 has friction means operative perpendicular to the axis R of rotation which is adapted to control the angular position of the lever 50 about the axis R of rotation. In conjunction therewith, according to the invention, the camming surfaces 51 and 52 are both located on the same side of a plane P passing through the axis R of rotation of the lever 50 and through the axis of the clutch (or parallel thereto), the part of the cover assembly 11 which cooperates with the camming surface 52 being the cover 13.

The plane P is represented schematically by a line in FIGS. 1, 5, 6 and 10 which line coincides with the corresponding axis R of rotation or passes through the line representing the axis R of rotation.

In the illustrated embodiments the support plate 53 for the travel limiting lever 50 is cantilevered axially with respect to at least one right-angled fastening lug 55 by which it is secured sideways, for example, by a rivet 56, on the terminal pressure plate 16, and more particularly on boss 58 radially projecting from the edge of the terminal pressure plate 16.

In the FIGS. 1-9 embodiment two separate fastening lugs 55 are provided on the side of the support plate 53 facing toward cover 13 and similarly two separate bosses 58 are provided on the edge of the terminal pressure plate 16.

Each travel limiting lever 50 is attached to its support plate 53 by a rivet 50 which also clamps a friction washer 61 and one or more spring washers 62 and defines the axis of rotation R of the travel limiting lever 50.

In the embodiment illustrated in FIGS. 1-9, each travel limiting lever 50 extends radially beyond its support plate 53. The associated friction washer 61 is disposed radially between the support plate 53 and the travel limiting lever 50. And the spring washers 62 are disposed on the side of the support plate 53 radially remote from the friction washer 61.

As will be readily understood the friction washer 61 comprises the friction means associated with such a travel limiting lever 50 and the spring washers 62 provide the resilient loading.

In practice the resilient loading is selected so that the friction means allows the travel limiting lever 50 to pivot about its axis R of rotation when it is subjected to the resilient engagement means defined by the diaphragm spring 39 and prevents rotation about the axis of rotation R when the travel limiting lever 50 is subjected to the resilient disengagement means defined by resilient drive straps 34.

Each travel limiting lever 50 comprises in the various illustrated embodiments at least one arm 64 directed generally radially. This arm 64 extends in a direction axay from the axis A of the clutch to make it easier to grasp the same.

In practice, and for reasons that will become apparent hereinbelow, two arms 64 are provided. The arms 64 extend in diametrically opposite directions relative to the axis R of rotation.

Preferably, as illustrated, an abutment 65 fixed to the terminal pressure plate 16 is provided in the path of the travel limiting lever for reasons which will be given below. In practice, in the illustrated embodiments, the abutment 65 is carried by the support plate 53 on the side thereof which is remote from both cover 13 and camming surfaces 51 and 52 of the travel limiting lever 50. In the FIGS. 1–9 embodiment abutment 65 is located on the side of the support plate 53 remote from the one from which the fastening lugs 55 extend, being situated on the other side of the plane P relative to the camming surfaces 51, 52 of the associated travel limiting lever 50.

The abutment 65 is in practice an angle member or part on the support plate directed generally away from the axis of the clutch.

In practice, the travel limiting levers 50 extend in recesses or cutouts 31 in the sidewall 18 of cover 13, the recesses or cutouts 31 being of sufficient circumferential dimensions to accommodate the levers 50. The camming surface 52 is adapted to come axially into engagement with the edge of the recess or cutout 31 and more particularly with the boss 66 projecting axially from the edge of the recess or cutout 31 (see FIG. 6).

When the clutch cover assembly 11 is stored, before being mounted on a reaction plate or flywheel 10, the shims 30 limit the action of the diaphragm spring 39 by bearing axially against the corresponding edges of the recesses or cutouts 24 in the cover 13. Straps 28 and 34 are thus advantageously spared.

Figure 8:
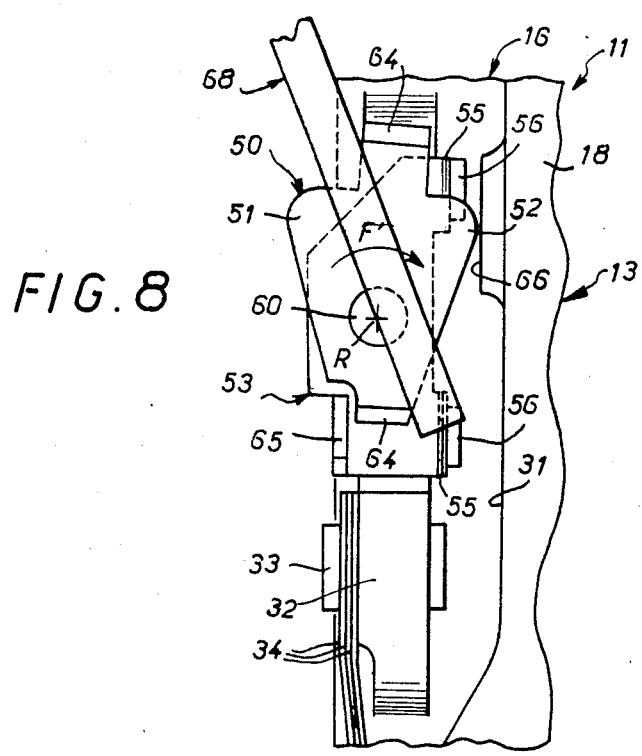
FIG. 8 is a view similar to that of FIG. 6 illustrating the use of the travel limiting lever during the mounting of the cover assembly on the reaction plate.

When mounting the cover assembly 11 on the reaction plate 10 it may be necessary to adjust the position of the inner clutch disc 17 radially with respect to the axis A of the clutch. To then release the inner clutch disc 17 which is normally clamped between the pressure plates 15 and 16, in particular under the action of resiliently deformable straps 34, at least one of the travel limiting levers 50 is swung about its axis R of rotation in the direction of arrow F' in FIG. 8 until camming surface 52 on lever 50 comes into engagement with the corresponding boss 66 on cover 13 as illustrated in FIG. 8. The travel limiting lever 50 then bearing against cover 13 may continue its swinging movement displacing the terminal pressure plate 16 axially away from the cover 13 and thereby freeing the inner clutch disc 17.

As illustrated in FIG. 8 the swinging movement of the travel limiting lever 50 may be made easier by inserting some sort of a tool 68 such as a screwdriver diagonally between arms 64.

It will be readily understood that abutment 65 associated with travel limiting lever 50 limits, in association with the adjacent are 34, the permissible swinging movement and therefore it advantageously spares the resiliently deformable drive straps 34 associated with the terminal pressure plate 16.

Figure 9A:
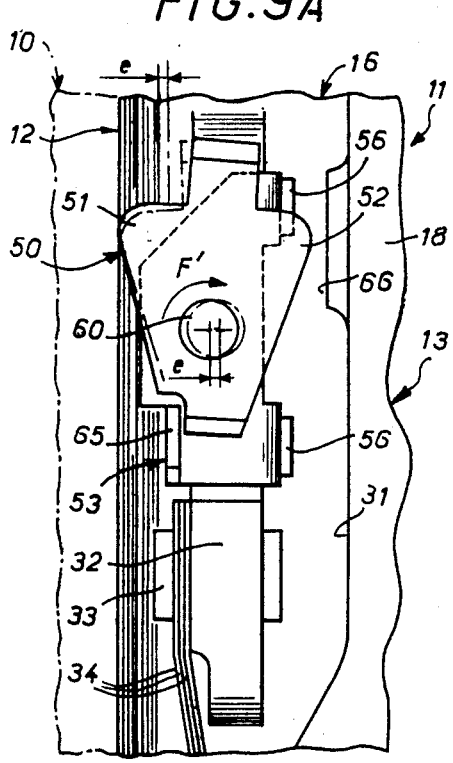
FIGS. 9A and 9B are views similar to FIG. 6, illustrating the operation of the travel limiting means during engagement and disengagement of clutch comprising a cover assembly according to the invention.

Before mounting the clutch cover assembly 11 on the reaction plate 10 each one of the travel limiting levers 50 is swung in the opposite direction so that at the completion of mounting, as shown in FIG. 9A, one such travel limiting lever 50 has its camming surface 51 securely in axial engagement with the reaction plate 10.

After mounting the cover assembly 11 on the reaction plate, and in the absence of any action of the clutch release bearing 45, the pressure plates 15, 16 are normally urged into engagement, owing to the relative strengths of the engagement means and the disengagement means, whereby the outer clutch disc 12 is axially clamped between the reaction plate 10 and the terminal pressure plate and the inner clutch disc 17 is clamped axially between the terminal pressure plate 16 and the intermediate pressure plate 15.

If in the course of engagement the friction facings on the outer clutch disc 12 are subjected to wear, the terminal pressure plate 16 moves axially closer to reaction plate 10 whereby under the action of the reaction plate 10, the travel limiting levers 50 swing about their axes R of rotation toward cover 13 in the direction of arrow F' in FIG. 9A.

In FIG. 9A is shown in solid lines the momentary position of the travel limiting lever 50 and its initial position is partially diagrammatically shown in chain-dotted lines before wear e of the friction facings of the outer clutch disc 12.

At all times the angular position of the travel limiting lever 50 about the axis R of rotation follows the state of wear of the friction facings of the outer clutch disc 12.

Upon disengagement the effects of the resilient engagement means defined by the diaphragm spring 39 being momentarily removed, the terminal pressure plate 16 is urged by the resilient disengagement means defined by the resiliently deformable drive straps 34 associated therewith and the pressure plate 16 moves closer to the cover 13. Yet during this movement the travel limiting levers 50 carried thereon have their camming surfaces 52 come into axial engagement with the corresponding abutments 65 on the cover 13, FIG. 9B. Owing to the spring loading of the friction means associated with the travel limiting levers 50 the latter are not then subjected to any return rotational movement about their axes R of rotation and retain the angular position they had at the completion of the preceding engagement.

Figure 9B:
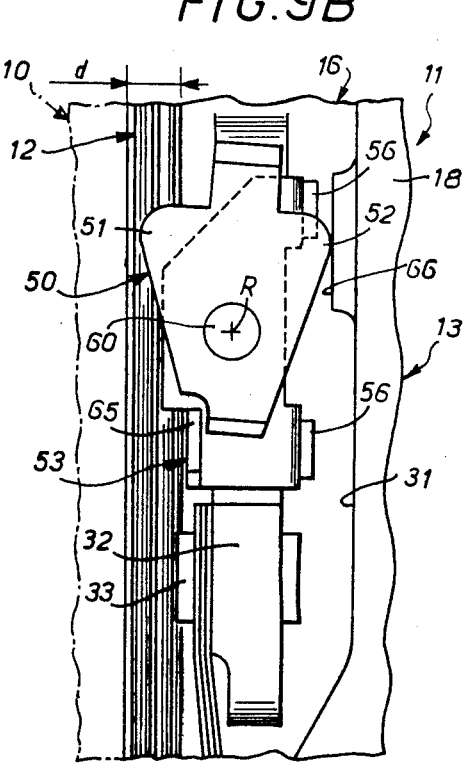

The lift or travel of the terminal pressure plate 16 is therefore interrupted and limited to a value d, FIG. 9B, selected to insure the sought after release of the inner friction disc 17; the intermediate pressure plate 15 may continue its lift or travel under the action of the resilient disengagement means defined essentially by clips 46 for the diaphragm spring 39. During a first period of time the resiliently deformable straps 28 of appropriate camber for partaking in the lift or travel but the lift or travel is in practice too large. During a second period of time after reversing their camber the straps 28 produce the opposite force.

When the release bearing 45 is released, the pressure plates 15 and 16 are once again urged into engagement by diaphragm spring 39 and the clutch discs 17 and 12 are therefore once again in axially clamped relation.

In the FIGS. 10 and 11 embodiment the friction washer 61 associated with each travel limiting lever 50 is disposed radially beyond the lever 52, between the lever 50 and the head of the corresponding rivet 60 about which it is rotatably mounted and the spring washers 62 are disposed radially between the travel limiting lever 50 and the support plate 53.

Further, in this embodiment the abutment 65 associated with each of the travel limiting levers 50 is disposed on the same side of the support plate 53 as the fastening lugs 55 of the support plate 53, the blank from which it is made then being folded to a single side.

In practice, in this embodiment, the fastening lugs 55 of the support plate 53 are in circular continuity with one another thereby forming a single flange and the associated abutment 65 is also part thereof. The fastening lugs 55 and the abutment 65 are in addition on the side of the support plate 53 remote from the cover 13.

Consequently, in this embodiment each of the travel limiting levers 50 has a notch 70 between its camming surfaces 51, 52 in which the corresponding autment 65 is received with clearance, which abutment is disposed on the same side of plane P as the camming surfaces 51 and 52 of the travel limiting lever 50 for cooperation with the edges of the notches 70.

Further, the camming surfaces 51 and 52 both have part circular contours, the part circular contours of the camming surfaces lying on the same circle C represented in chain-dotted lines in FIG. 11, whereby upon disengagement the distance between the terminal pressure plate 16 and the cover 13 is always constant. In this respect the position of the center of circle C is unimportant.

Finally, in the FIGS. 10-11 embodiment, the tangent T to the circumference C' of the cover assembly passing through the intersection of the axis R of rotation of the travel limiting lever 50 and the general plane of the travel limiting lever makes an angle G with the general plane of the travel limiting lever, and the general plane of the travel limiting lever intersects the circumference C' to the same side of the axis of rotation of the travel limiting lever as camming surface 52, as schematically illustrated in chain-dotted lines in FIG. 10. In other words, in this embodiment, the axis R of rotation of each of the travel limiting levers 50 makes an angle G with the normal at the corresponding point of the circumference C' defined above, and instead of passing through the axis A of the clutch, as above, the plane P containing axis R of rotation is only parallel to axis A.

Owing to this arrangement the camming surface 51 of each of the travel limiting levers 50 may bear advantageously against a zone of the reaction plate 10 which is radially closer to the axis of the clutch and therefore more easily controlled because it is radially remote from the zone or part of the reaction plate 10 on which the cover 13 is mounted.

In the embodiment illustrated in FIG. 12 each of the travel limiting levers 50 is radially disposed inwardly of the support plate 53, the friction washer 61 associated therewith being disposed between the lever 50 and the support plate 53 whereas the corresponding spring washers 62 are disposed radially beyond the support plate 53.

In particular the fastening lugs of the support plate may be disposed on both sides of the same boss on the intermediate pressure plate.

The field of the present invention is not limited to double disc friction clutches but encompasses more generally all multiple clutches of which the corresponding cover assembly may be a distinct component whether or not a unitary assembly.

Likewise, in the case of a dual friction clutch, which has two outputs, one of the output shafts may be controlled by a double disc friction clutch having one or more travel limiting levers according to the present invention.

What I claim is:

1. A multiple clutch cover assembly, said clutch cover assembly having an axis and comprising a cover defining a housing and adapted to be mounted on a reaction plate or flywheel, two axially spaced annular pressure plates including an intermediate pressure plate and a terminal pressure plate, an inner clutch disc disposed axially between said intermediate and terminal pressure plates, an outer clutch disc to be disposed axially between said terminal pressure plate and said reaction plate or flywheel, resilient engagement means bearing against said cover and constantly urging said pressure plates away from said cover, and disengagement means for urging said pressure plates individually toward said cover, said terminal pressure plate having a travel limiting lever rockably mounted about an axis of rotation disposed at right angles to said axis of the cover assembly, said travel limiting lever having two camming surfaces, one of said camming surfaces being selectively engageable with said reaction plate or flywheel when said cover assembly is in its engaged position and the other of said camming surfaces being selectively engageable with said cover when said cover assembly is in its disengaged position, said travel limiting lever having resiliently preloaded friction means operative perpendicularly to said axis of rotation for impeding angular movement of said travel limiting lever, both of said camming surfaces being disposed on the same side of a plane containing said axis of rotation and being substantially parallel to said axis of said cover assembly.

2. A cover assembly according to claim 1, wherein said plane contains said axis of said cover assembly.

3. A cover assembly according to claim 1, wherein said travel limiting lever comprises an arm directed radially outwardly away from said axis of said cover assembly, so that said travel limiting lever may be easily grasped.

4. A cover assembly according to claim 1, wherein said travel limiting lever comprises two camming surfaces having part circular contours lying along the same circle.

5. A cover assembly according to claim 1, wherein a tangent to the circumference of said cover assembly passing through the intersection of the axis of rotation of the travel limiting lever and the general plane of the travel limiting lever makes an angle with the general plane of said travel limiting lever, and the general plane of said travel limiting lever intersects the said circumference to the same side of said axis of rotation of the travel limiting lever as said camming surfaces.

6. A cover assembly according to claim 1, wherein said resiliently preloaded friction means permits rocking movement of said travel limiting lever about said axis of rotation in response to said resilient engagement means and prevents rocking movement of said travel limiting lever in response to said disengagement means.

7. A cover assembly according to claim 1, together with a reaction plate or flywheel, means fixing the cover to the reaction plate or flywheel.

8. A cover assembly according to claim 1, wherein said travel limiting lever is mounted on said terminal pressure plate, a support plate rockably mounting and supporting said travel limiting lever on said terminal pressure plate, said support plate being cantelivered from a right-angled fastening lug fixed to said terminal pressure plate.

9. A cover assembly according to claim 8, wherein an abutment is fixed to said terminal pressure plate and disposed along the path of rocking movement of said travel limiting lever, said abutment being carried by said support plate.

10. A cover assembly according to claim 9, wherein said abutment is disposed on the same side of said support plate as said fastening lug.

11. A cover assembly according to claim 10, wherein said abutment is disposed on the side of said support plate remote from said fastening lug.

12. A cover assembly according to claim 1, wherein an abutment is fixed on said terminal pressure plate and disposed along the path of rocking movement of said travel limiting lever.

13. A cover assembly according to claim 12, wherein said travel limiting lever has a notch, said abutment being arranged with clearance in said notch.

14. A multiple clutch cover assembly, said cover assembly having an axis and comprising a cover defining a housing and adapted to be mounted on a reaction plate or flywheel, two axially spaced annular pressure plates including an intermediate pressure plate and a terminal pressure plate, an inner clutch disc disposed axially between said intermediate and terminal pressure plates, an outer clutch disc disposed axially between said terminal pressure plate and said reaction plate or flywheel, resilient engagement means bearing against said cover and constantly urging said pressure plates away from said cover, and disengagement means for urging said pressure plates individually toward said cover, said terminal pressure plate having a travel limiting lever rockably mounted about an axis of rotation disposed at right angles to the axis of the cover assembly, said travel limiting lever having two camming surfaces, one of said camming surfaces being selectively engageable with said reaction plate or flywheel when said cover assembly is in its engaged position and the other of said camming surfaces being selectively engageable with said cover when the cover assembly is in its disengaged position, said travel limiting lever having resiliently preloaded friction means operative perpendicularly to said axis of rotation for impeding angular movement of said travel limiting lever, said resiliently preloaded friction means permitting rocking movement of said travel limiting lever about said axis of rotation in response to said resilient engagement means and preventing rocking movement of said travel limiting lever in response to said disengagement means.

* * * * *